June 16, 1964 W. L. CUTHBERT, JR 3,137,225

PROCESSING UNIT WITH A REPLENISHING SYSTEM

Filed Dec. 18, 1961 3 Sheets-Sheet 1

WILLIAM L. CUTHBERT, JR.
INVENTOR.

BY R. Frank Smith
Paul R. Holmes
ATTORNEYS

WILLIAM L. CUTHBERT, JR.
INVENTOR.

BY R. Frank Smith
Paul R. Holmes
ATTORNEYS

PROCESSING UNIT WITH A REPLENISHING SYSTEM

Filed Dec. 18, 1961

WILLIAM L. CUTHBERT, JR.
INVENTOR.

BY R. Frank Smith

Paul R. Holmes
ATTORNEYS

United States Patent Office 3,137,225
Patented June 16, 1964

3,137,225
PROCESSING UNIT WITH A REPLENISHING SYSTEM

William L. Cuthbert, Jr., Rochester, N.Y., assignor to Eastman Kodak Company, Rochester, N.Y., a corporation of New Jersey
Filed Dec. 18, 1961, Ser. No. 160,147
5 Claims. (Cl. 95—89)

This invention relates to a processing apparatus and more particularly to a processing unit for developing a latent image on an exposed photosensitive print material.

The processing unit of the present invention was originally devised for use in a photographic projection printer to develop a latent image on print material through contact of the photosensitive surface of the print material with a monobath processing solution. As known in the art, the term monobath refers to a solution which contains ingredients for developing a latent image on a photosensitive emulsion and ingredients for stabilizing the developed image. It should be understood, however, that the processing unit does not need to be combined with a photographic projection printer nor must it be utilized with a monobath processing solution. Instead, the novel features of the processing unit could be used either separtely or in conjunction with other processing apparatus and the unit could be used to contact any sheet material with any liquid. In order to facilitate the understanding of the invention it will be described herein as it is used in a photographic projection printer.

In known processing apparatus wherein a photosensitive print material is contacted with small metered quantities of processing solution, for developing a latent image on the print material, it is necessary to replenish frequently the solutions used in the processing units sometimes even after each processing cycle. This raises problems with respect to the obtaining of an evenly developed latent image because the new processing solution which is added to the used solution may not be completely mixed prior to contact with the print material. The processing unit of the present invention overcomes this disadvantage present in known apparatus and comprises broadly a small reservoir for receiving a metered quantity of processing solution during each processing cycle and for keeping the metered solution out of contact with the latent image being developed on that section of print material. Thus, the metered solution which is held in the reservoir is available to renew the remaining solution in the processing unit and to treat the next sheet of print material which is moved into the processing unit.

The primary object of the present invention is, therefore, to provide an improved processing apparatus for developing photosensitive print material.

Another object of the present invention is to provide a processing apparatus in which the latent images on exposed print material are developed evenly and uniformly.

Still another object of the present invention is to provide a processing unit which is adapted to receive a metered fresh quantity of processing solution after each print processing cycle.

Yet, another object of the present invention is to provide a processing unit in which a certain proportion of solution in the unit is purged therefrom after each processing cycle.

Still other objects and advantages of the present invention will become readily apparent to those skilled in the art from the following description with reference to the drawings in which like characters denote like parts and wherein.

Figure 1:
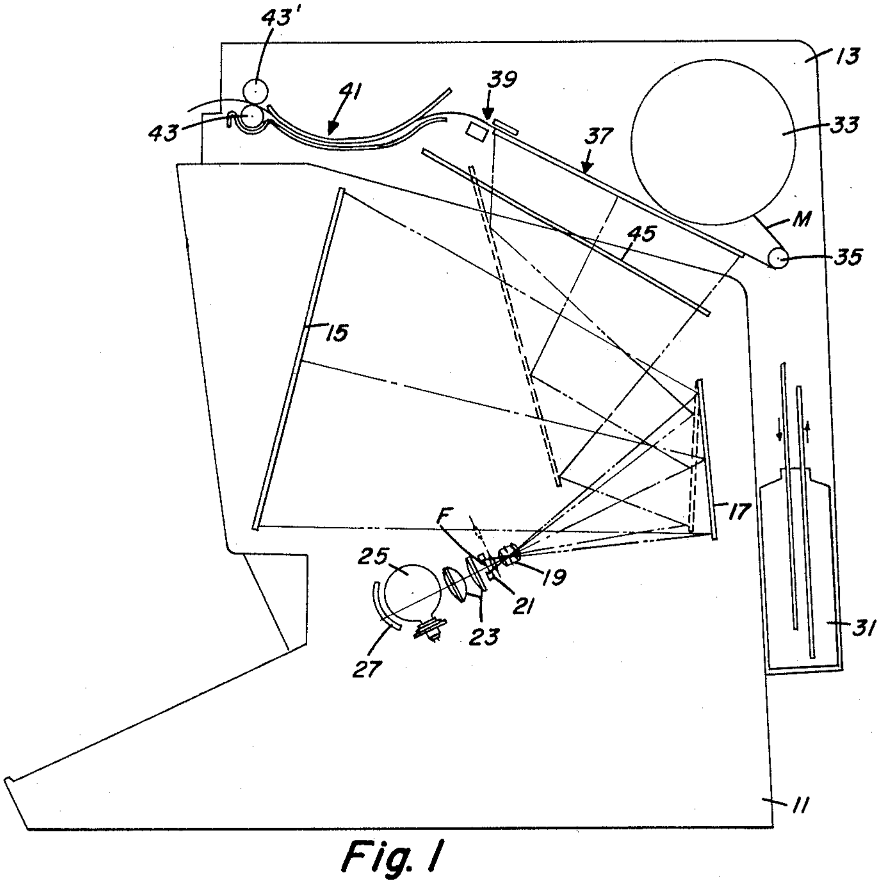
FIG. 1 is a schematic view of a projection reader and printer accessory which incorporates the processing unit of the present invention.

In FIG. 1 of the drawings the numeral 11 designates generally a projection reader and the numeral 13 designates a printer accessory for the reader. The projection reader 11 comprises a viewing screen 15, a rear projection mirror 17, a projection lens 19, a film gate 21, condensing optics 23, a projection lamp 25 and a reflector 27. To operate the reader, a strip of film F, microfilm for example, is selectively moved through the film gate 21 by conventional drive means and the images on the film F are projected by the optics of the reader to mirror 17 and onto the viewing screen 15. This apparatus is well known in the art and will not be described in detail, herein.

The projection printer comprises a bottle 31, which contains a supply of monobath processing solution, a roll 33 of unexposed photosensitive print material M, a driven roller 35 for moving print material M from the roll 33 to the printing station 37 and after exposure through the cutoff station 39 and processing unit 41. The processing unit 41 includes squeegee and drive rollers 43 and 43' for discharging the processed print material from the processing unit to the front of the projection printer. The projection printer also incorporates means for moving rear mirror 17 forward slightly and an upper mirror 45 downwardly into the path of the projected image to intercept the image from the mirror 17 and to direct the same onto the unexposed print material M in the printing station 37. The projection printer also includes means for modifying the optical system of the projection reader 11 so that the image which is projected into the printing station 37 is in focus on the print material and is sufficiently reduced in size to fit the reduced size of the printing station 37 as compared to the viewing screen 15. This latter mechanism forms no part of the present invention and will not be described in detail herein. Furthermore no part of the projection printer will be described in detail unless that part is pertinent to the processor unit of the present invention.

Figures 2, 3, 4:
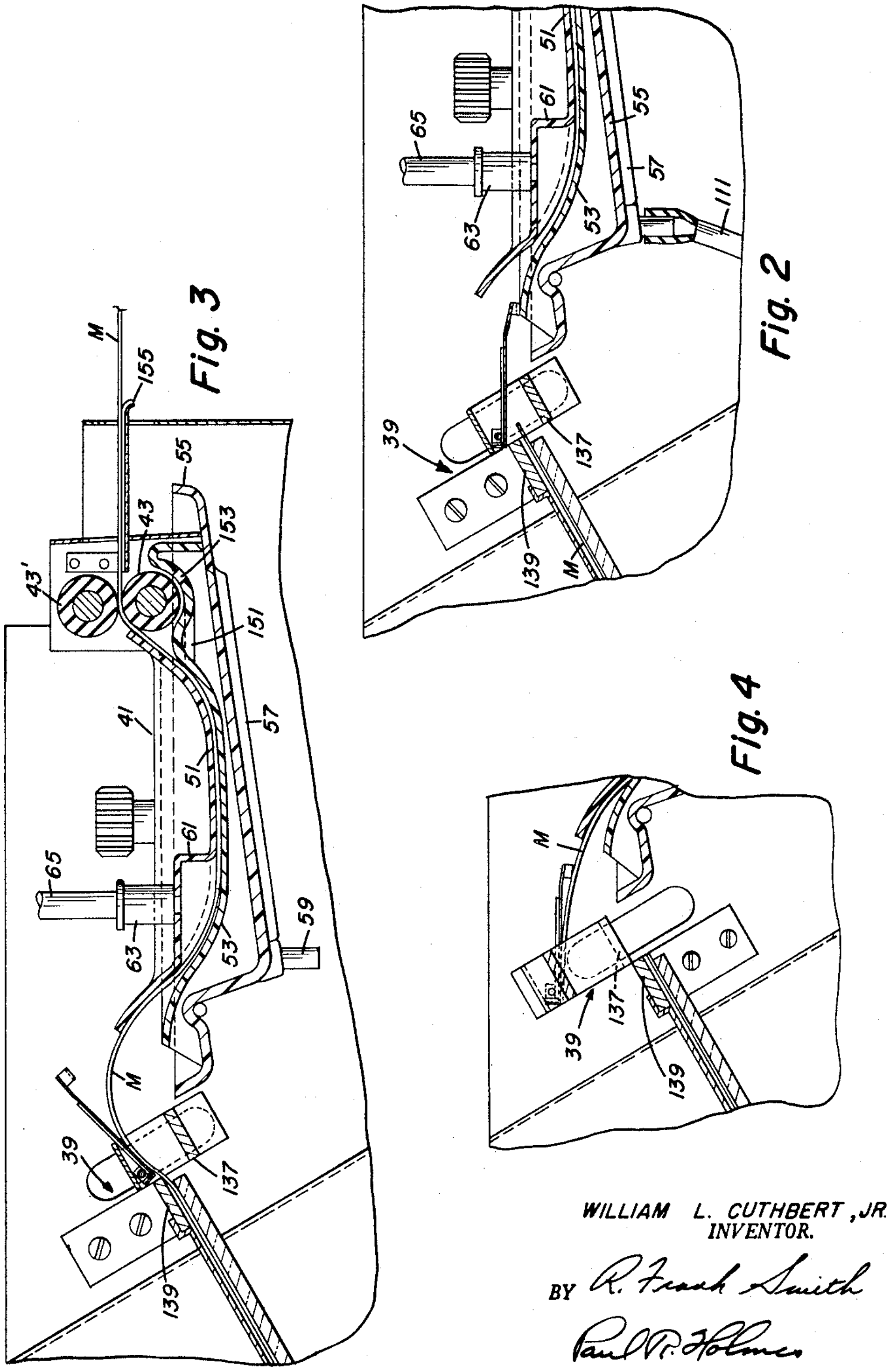
FIGS. 2, 3 and 4 are enlarged cross-sectional views of the processing unit showing the general arrangement of the parts thereof.

The processing unit of the present invention is shown in greater detail in FIGS. 2, 3, 4, and 5 of the drawings. FIG. 2 shows the exposed print material M as it starts to move through cut-off station 39 toward the processing unit 41. FIG. 3 shows the print material as it is being moved through the processing unit 41 immediately prior to cut-off in the cut-off station 39. FIG. 4 shows the print material M just after cut-off in the station 39.

Figure 5:
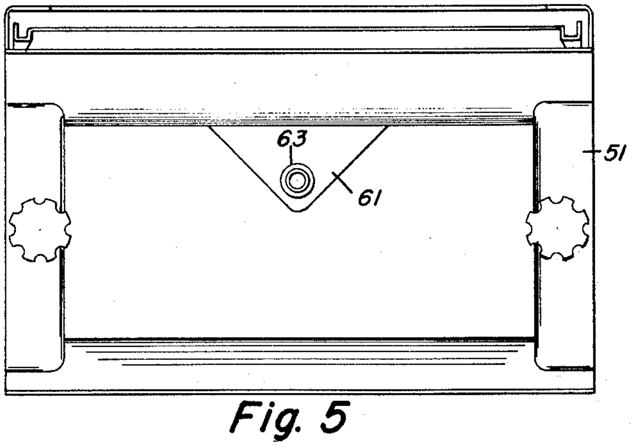
FIG. 5 is a plan view of the processing unit.
Figures 6, 7:
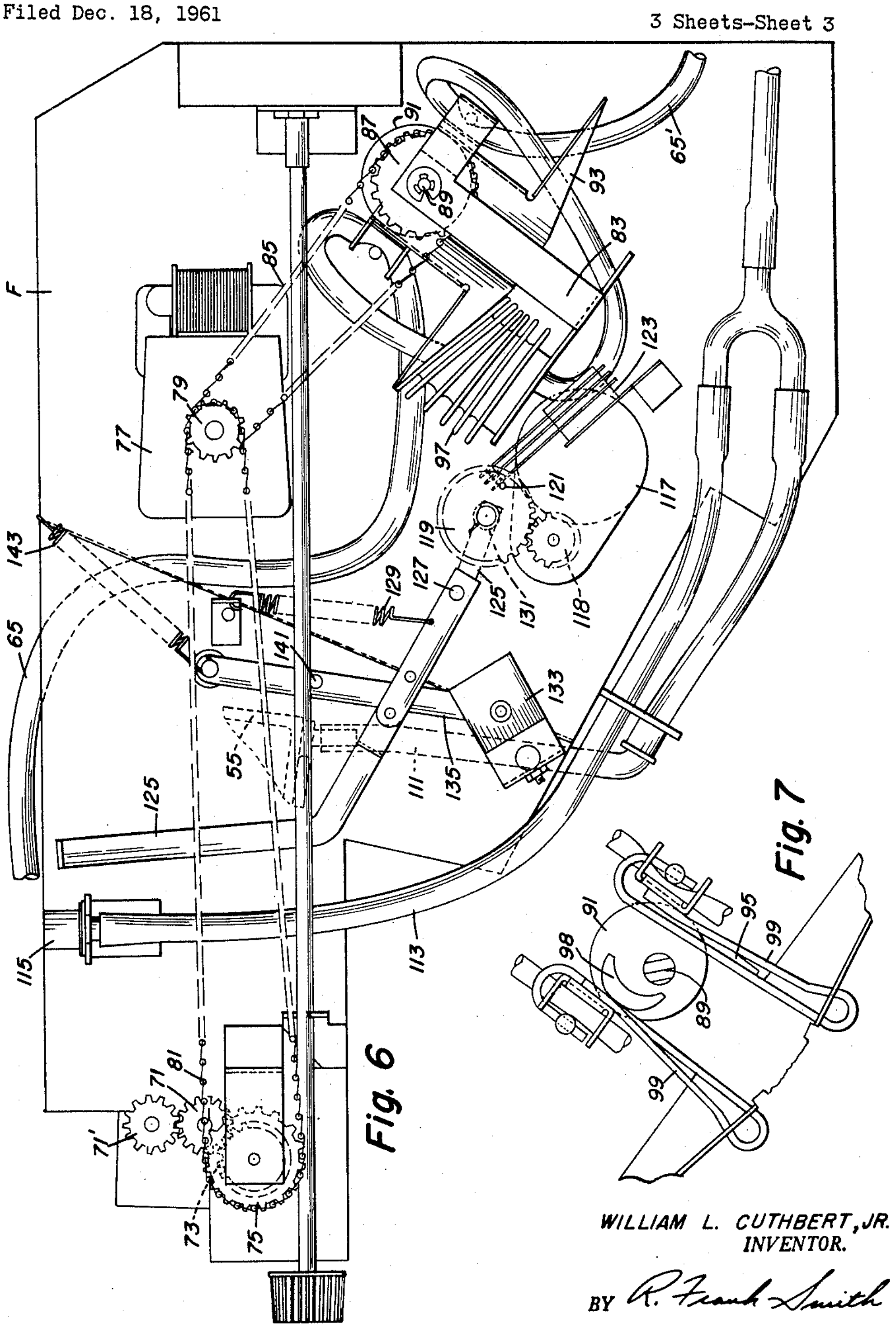
FIG. 6 is a side elevation view of the printer accessory showing portions thereof which relate to the processing unit.
FIG. 7 is a detailed view, partly in section, of the processing solution pump.

The processing unit 41 comprises an upper tray 51, a middle tray 53 and a lower tray 55. The lower tray 55 has a drain groove 57 which conveys used processing solution to the return drain hose fitting 59 at the lower end of the tray 55. Upper tray 51 is formed with a reservoir 61 which is connected through a fitting 63 and hose 65 to the processing solution pump which pumps solution from bottle 31 into the processing unit. It will be noted that the cross-sectional configuration of middle tray 53 and upper tray 61 is such that together they form a path through which the print material M is moved. The processing solution in the processing unit 41 fills the major portion of the path so that the print material M is contacted by the solution as it is fed through the path. It should be noted that the under surface of the reservoir 61 has a shape which conforms generally to the shape of the path. The reason for this configuration will be described in detail hereinafter. In FIG. 5 the reservoir 61 in plane view is substantially triangular. Referring to FIG. 6 the numerals 71 and 71' designate meshing gears which drive squeegee rollers 43 and 43' respectively. Gear 71 is driven by a gear 73 which is fixed on a shaft with sprocket 75. Sprocket 75 is driven by the drive motor 77 from a sprocket 79 and through chain 81. Motor 77 also drives and operates a bellows pump 83 by means of a sprocket positioned in back of sprocket 79, a chain 85 and pump sprocket 87. Pump sprocket 87 is mounted on a shaft 84 which also carries cam 91 so that rotation of the sprocket is transmitted to the cam. The eccentric relation of the peripheral surface on cam 91 with respect to shaft 84 causes the pump rocker 93 to be oscillated about shaft 89 as a result of the contact of the flanges 95 with the periphery of cam 91 during rotation of the cam. Pivotal movement of the rocker 93 operates the pump bellows 97 which causes solution to be pumped from the container 31 through the hose 65 and 65' to the reservoir 61 in the processing unit. A second cam surface 98 fixed on cam 91, engages a pair of spring clips 99 which open and close the passages through the hose 65 and hose 65'. Thus, clips 99 act as valves for the pump 83.

Drain hose 111 is connected to the fitting 59 in the lower tray 55 and returns the used processing solution to container 31 where it is mixed with the rest of the solution for reuse. The drain hose 113 is connected to drain hose 111 by means of a "Y fitting" and has a fitting 115 for receiving the hose 65 when it is found necessary to disassemble the processing unit.

The numeral 117 designates a timing motor which drives gear 118 through a suitable gear reducer. Gear 119 carries a pin 121 for engaging the actuating contacts of processor motor switch 123 upon being driven by motor 117 through gear 118. Gear 119 is carried by link 125 which is pivotally mounted on the printer accessory frame F about a stud 127. The spring 129 urges the gear 119 toward engagement with the gear 118 of the timing motor 117. A small helical spring 131 which is wound around the mount for gear 119 is arranged to resiliently urge gear 119 to a start position wherein pin 121 contacts the supporting link 125. Thus, the timed period extends from the instant the gear 119 engages gear 118 until pin 121 closes switch 123. At the end of the period motor 77 is stopped.

The numeral 133 designates the chopper crank. This crank through link 135 draws the movable knife 137 downwardly past the fixed knife 139 prior to the feeding movement of print material M through the cut-off station 39. A link and a crank similar to the ones designated 135 and 133 respectively are provided on the other side of the accessory to cooperate with the ones shown to move knife 137. The mechanism for driving crank 133 is also mounted on the other side of the printer accessory. Link 135 carries a pin 141 which engages the link 125 when the chopper crank is actuated to lower the movable knife 137 with the result that the link 125 is pivoted about stud 127 and gear 119 is raised away from gear 118. This resets gear 119 so that pin 121 is in engagement with the link 125. Shortly after movement of print material through cut-off station 39 is initiated, the electrical circuit to motor 77 is closed thereby starting the motor to drive rollers 43 and 43' and pump 83. When the exposed section of print material M has been moved through the cutoff station 39, that is between movable knife 137 and fixed knife 139, see FIGS. 2, 3, and 4, the chopper crank is released and the upper knife spring 143 and the corresponding spring on the other side of the printer accessory draws the movable knife 137 over the fixed blade 139 thereby severing the print material M. The severed print material M is then in the position shown in FIG. 4. Simultaneously with the severing movement of knife 137, pin 141 is disengaged from link 125, gear 119 engages the gear 118 and the timing motor 117 drives gear 119 to commence the timed cycle during which motor 77 continues to drive rollers 43 and 43' and pump 83. At the end of the timed cycle when the contacts on the switch 123 are closed by pin 121 motor 77 stops. This immediately stops the pump 83 and halts the squeegee drive rollers 43 and 43' but it will be understood, of course, that the timed period is sufficiently long to permit the processed print material M to have been discharged by rollers 43 and 43' from the printer accessory.

Referring again to FIG. 3, the processing cycle for the processing unit will be described. As the print material M is advanced through the cutoff station 39 toward the processing unit 41, pump 83 starts to supply processing solution to the processing unit just a little before the print material M closes off the open underside of reservoir 61. This first quantity of processing solution tends to purge some of the used solution from the unit and to renew that which remains between the upper tray 51 and the middle tray 53. As will be hereinafter explained the solution in the path is first renewed by the solution which had been stored in reservoir 61 during most of the preceding processing cycle. The excess solution flows over the weir 151 and down into the lower tray 55 through the drain hole 153. As the print material M is moved further into the processing unit 41, the upper (unsensitized) surface of the print material closes the open underside of reservoir 61 and prevents further solution from entering into the path between the upper tray 51 and the middle tray 53. The solution pumped to reservoir 61 by pump 83 is held in the reservoir by the moving upper surface of print material M. The exposed image on the photosensitive (under) surface of print material M is developed by the processing unit. Then, when the exposed portion of print material M is severed from the rest thereof, the rollers 43 and 43' continue to be driven by motor 77 and the print material M is finally discharged over the guide shelf 155 to the front of the machine where it is received by the operator.

The drain hole 153 is located to maintain the solution at a level such that a portion of the periphery of roller 43 is in contact with the solution. Thus, if crystals of solution form on the rollers 43 and 43' during periods of non-use, the solution on the periphery of roller 43 will dissolve the crystals upon commencing the movement of rollers, and damage to the print material passing between the rollers will not occur.

As the trailing edge of the severed print material M passes the reservoir 61 the solution then in the reservoir is discharged into the path between the upper tray 51 and the middle tray 53 tending to purge more of the used solution therein from the unit. The solution from the reservoir 61 tends to be held in back of the trailing edge of print material M as it moves through the unit and the solution in the processing unit is therefore relatively "freshened" for processing the next section of print material moved through the unit. Thus, the processing unit 41 is readied for the next exposed section of print material M to be processed. It will be appreciated that the system disclosed is one in which the solution is recirculated after use. Therefore, it is necessary to periodically replace the solution in container 31 with new unused solution.

Having now described the novel features and operation of the processing unit of the present invention, the many advantages which result therefrom will be apparent to those skilled in the art. For example, it will be readily appreciated that the processing unit disclosed and described herein is capable of eliminating to a substantial degree the streaking of images which occurs in many known processing units as the result of an uneven development of the latent image on print material. The invention has been described in detail with particular reference to preferred embodiments thereof but it will be understood that variations and modifications can be effected within the spirit and scope of the invention as described hereinabove and as defined in the appended claims.

Having now particularly described my invention what I desire to secure by Letters Patent of the United States and what I claim is:

1. In a photographic processing apparatus for developing a latent image carried by a print material through contact with a processing solution from a supply thereof and having;

(a) first wall means forming a container for said processing solution, (b) second wall means complementary to and spaced from said first wall means to form a path which is substantially filled with solution for guiding said material through the solution, and (c) means for moving said material through said path, the improvement which comprises:

(1) a reservoir for said solution formed in said second wall means, said reservoir being open along said path on the underside of said second wall means and being so disposed relative to said first wall means that the open reservoir is closed by the material when in said path adjacent to the reservoir, and (2) means for feeding solution from said supply to said reservoir in relation so timed to the movement of said material through said path, that the solution is temporarily held in the reservoir by the material then passing through said path.

2. The improvement in accordance with claim 1 and further comprising means for returning said processing solution to said supply for recirculation to said reservoir.

3. The improvement in accordance with claim 1 and wherein the photographic apparatus includes co-operating drive rollers disposed to squeegee the print material leaving said arcuate path and to discharge the same from the processing apparatus.

4. The improvement in accordance with claim 3 and wherein one of the drive rollers is mounted on said first wall means so that a portion of its periphery is submerged in the solution.

5. The improvement in accordance with claim 4 and wherein said first wall means has a drain which is connected with said supply and which is located in the wall means at a level such that the solution in the container is maintained at a level sufficient to substantially fill said path and to contact evenly the surface of the print material as it is moved through said path.

References Cited in the file of this patent

UNITED STATES PATENTS

| | | |
|---|---|---|
| 2,475,809 | Sullivan et al. | July 12, 1949 |
| 2,538,270 | Pratt et al. | Jan. 16, 1951 |
| 2,897,080 | Teiser et al. | July 28, 1959 |
| 2,997,937 | Limberger | Aug. 29, 1961 |
| 3,002,434 | Reuter | Oct. 3, 1961 |

FOREIGN PATENTS

| | | |
|---|---|---|
| 65,478 | France | Oct. 19, 1955 |
| 1,188,248 | France | Mar. 9, 1959 |